(12) United States Patent
Gholizadeh Mojaveri et al.

(10) Patent No.: US 12,241,450 B2
(45) Date of Patent: Mar. 4, 2025

(54) WIND TURBINE SUPPORT ASSEMBLY AND WIND TURBINE

(71) Applicant: Siemens Gamesa Renewable Energy A/S, Brande (DK)

(72) Inventors: Omid Gholizadeh Mojaveri, Aarhus (DK); Esben Kobbelgaard, Børkop (DK)

(73) Assignee: Siemens Gamesa Renewable Energy A/S, Brande (DK)

(*) Notice: Subject to any disclaimer, the term of this patent is extended or adjusted under 35 U.S.C. 154(b) by 203 days.

(21) Appl. No.: 17/949,024

(22) Filed: Sep. 20, 2022

(65) Prior Publication Data

US 2023/0096926 A1    Mar. 30, 2023

(30) Foreign Application Priority Data

Sep. 27, 2021 (EP) ..................................... 21199110

(51) Int. Cl.
*F03D 13/20* (2016.01)

(52) U.S. Cl.
CPC .......... *F03D 13/20* (2016.05); *F05B 2240/14* (2013.01); *F05B 2240/912* (2013.01)

(58) Field of Classification Search
CPC .................. F03D 13/20; F05B 2240/14; F05B 2240/912; Y02E 10/72; Y02E 10/725
See application file for complete search history.

(56) References Cited

U.S. PATENT DOCUMENTS

| | | | |
|---|---|---|---|
| 8,713,896 B2* | 5/2014 | Willis ..................... | F03D 13/10 52/651.01 |
| 2011/0138893 A1* | 6/2011 | Shiraishi ................. | F03D 80/00 73/66 |
| 2016/0160843 A1* | 6/2016 | Jensen .................... | F03D 13/20 52/650.3 |

FOREIGN PATENT DOCUMENTS

| | | | | |
|---|---|---|---|---|
| CN | 108223299 B | 12/2019 | | |
| DE | 102011007836 B | 10/2012 | | |
| DE | 102020124912 A1 * | 3/2022 | .......... | E04H 12/085 |
| EP | 3290694 A1 * | 3/2018 | | |
| EP | 3789610 A1 * | 3/2021 | ............. | F03D 13/20 |
| WO | WO 2007096008 A1 | 8/2007 | | |
| WO | 2011051272 A2 | 5/2011 | | |
| WO | WO-2013130544 A1 * | 9/2013 | .......... | E04H 12/085 |
| WO | WO-2019038709 A1 * | 2/2019 | ............. | F03D 13/20 |

OTHER PUBLICATIONS

EP Search Report Mar. 18, 2022, Reference No. 2021 P1 5204EP, Application No./Patent No. 21199110.4-1007, 8 pages.

* cited by examiner

*Primary Examiner* — Theodore V Adamos
(74) *Attorney, Agent, or Firm* — Schmeiser, Olsen & Watts, LLP

(57) ABSTRACT

A wind turbine support assembly includes a bedframe and a support structure, wherein the bedframe is adapted for attaching the support assembly to a wind turbine tower, wherein the support structure includes at least one beam, wherein a web section of the beam is attached to an attachment area of the bedframe by a bolted connection including at least one bolt arranged perpendicular to the web section, wherein on the side of the web section opposite to the attachment area at least one retaining means is arranged for holding a bolt or a nut, which is attached to the bolt, in a non-rotatable manner.

11 Claims, 7 Drawing Sheets

WIND TURBINE SUPPORT ASSEMBLY AND WIND TURBINE

CROSS-REFERENCE TO RELATED APPLICATIONS

This application claims priority to EP application Ser. No. 21/199,110.4, having a filing date of Sep. 27, 2021, the entire contents of which are hereby incorporated by reference.

FIELD OF TECHNOLOGY

The following relates to a wind turbine support assembly comprising a bedframe and a support structure, wherein the bedframe is adapted for attaching the support assembly to a wind turbine tower, wherein the support structure comprises at least one beam, wherein a web section of the beam is attached to an attachment area of the bedframe by a bolted connection comprising at least one bolt arranged perpendicular to the web section. Furthermore, the following relates to a wind turbine.

BACKGROUND

Wind turbines are increasingly used for the generation of electrical energy. Generally, a wind turbine comprises a tower and a nacelle that is mounted on top of the tower. The nacelle bears the rotor of the wind turbine and comprises a hub and a plurality of rotor blades attached to the hub. In the interior of the nacelle, mechanical and/or electrical components for the generation and/or conversion of electrical energy are arranged. In order to attach the nacelle to the tower, a wind turbine support assembly comprising a bedframe and a support structure may be used. The support assembly must carry a significant weight, since it supports the rotor, the nacelle and the components in the interior of the nacelle, which may comprise a considerable weight, on the tower.

In such a support assembly, the bedframe is used for attaching the support assembly to the tower, in particular to a yaw bearing to allow for rotating the nacelle. The support structure protrudes from the bedframe and allows for arrangement of the components of the drive train, in particular its mechanical and electrical components such as a main shaft, a gear box, a transformer unit, a converter and/or a generator. Therefore, a connection between the support structure forming the rear end of the nacelle and a bedframe is required.

In WO 2011/051272 A2, a wind turbine with an internal support structure is described. The support structure comprises a main foundation that is positioned at the front end of the nacelle and a rear frame that is connected to the main foundation at one end and extends from the main foundation towards the rear end of the nacelle. The foundation comprises at least one foundation connection area that is positioned where the rear frame is connected to the main foundation. The foundation connection area comprises at least a first face and a second face, which are arranged displaced in relation to each other. The rear frame is connected to the main foundation via the first face and the second face. The rear frame comprises two struts each consisting of two C-profiles, wherein one profile encompasses the other and wherein one of the profiles is bolted to the first face and the other profile is bolted to the second face of the connection area.

SUMMARY

An aspect relates to providing an improved wind turbine support assembly, which in particular facilitates the installation and/or the maintenance of the support assembly.

According to embodiments of the invention, an aspect relates to a wind turbine support assembly as initially described, wherein on the side of the web section opposite to the attachment area at least one retaining means is arranged for holding a bolt or a nut, which is attached to the bolt, in a non-rotatable manner.

The support structure of the wind turbine support assembly, which it is also referred to as support assembly for short, comprises at least one beam with a web section, hence with a center portion that is adjoining one or more flange sections of the beam. The beam may be for instance an I-beam comprising a web section arranged between two flange sections. Also other shapes of the beam, like a C-beam or a T-beam, are possible.

The at least one beam of the support structure is fixated to the bedframe by a bolted connection of the support assembly comprising at least one bolt, which is arranged perpendicular to the web section. It is in particular possible that the bolted connected comprises more than one bolt, in particular more than ten bolts.

The bolted connection using bolts arranged perpendicular to the web section of the beam has the advantage that the beam can be fixated to the bedframe without the usage of a welded flange, for instance of a flange welded to a face side of the beam structure. The bolts used for attachment of the beam may be arranged in bolt holes, which are drilled in the web of the beam, so that the bolts are aligned perpendicular to the web structure, or to the axis of the beam, respectively. In embodiments, the welding of one or more flanges to the beam can be omitted during manufacture of the support assembly.

For attachment, the support structure is bolted to an attachment area of the bedframe, hence one side of the web section may be in direct contact to the attachment area. Opposing to the attachment area, at least one retaining means is arranged, wherein the retaining means holds in a non-rotatable manner the at least one bolt and/or at least one nut that is attached to the bolt. This has the advantage that due to the retaining means, no tool is required on this side of the bolted connection for counteracting a tightening torque applied to the bolt, or the nut, respectively, at a side of the bolted connection opposing the retaining means.

In embodiments, the retaining means allows for facilitating the installation as well as service tasks like a retightening of the bolted connection. For mounting and/or retightening of the bolts, only one tool has to be used for applying the torque to one side of the bolted connection. On the other side, the tightening torque is counteracted by the retaining means preventing the bolt, or the nut, respectively to rotate during the application of the tightening torque. In particular for maintenance of an already installed wind turbine, the space requirement around the bolts of the bolted connections is reduced since only one side of the bolted connection has to be accessible. Likewise, this facilitates also the installation of the assembly structure correspondingly.

The retaining means may hold a nut or a bolt, in particular at a bolt head, in a non-rotatable manner, so that a rotation is prevented when a torque is applied to its respective counterpart in the bolted connection. The nut or the bolt may be fixated at least against rotation by using for instance a form-fit connection.

The bedframe is adapted for attaching the support assembly to a wind turbine, in particular to a jaw bearing on top of the tower. The bedframe may be adapted for a direct drive wind turbine or for a geared wind turbine. The support assembly is adapted for forming the support structure of a nacelle of the wind turbine and to bear the components of the drive train of the wind turbine like a main shaft, a gear box, a transformer unit, a converter and/or a generator. Also a canopy surrounding the components arranged inside the nacelle may be attached to the support assembly.

In an exemplary embodiment of the invention, the retaining means is arranged on an outside of the support structure facing away from the bedframe. Arranging the retaining means on the outside of the support structure has the advantage that a fastening or retightening of the bolted connection from the inside of the nacelle becomes possible without the need for the arrangement of a tool like a wrench or a spanner on the opposing side of the support structure.

The retaining means may face away from the bedframe either towards the center of the support assembly or towards an outer edge of the support assembly. Correspondingly, the retaining means may face towards a center of the nacelle allowing for accessing the bolted connection from the outer side of the nacelle, or it may be facing to the outer sides of the nacelle allowing for accessing the bolted connection from the inside.

In an exemplary embodiment, the beam is attached to an attachment area at an outside of the bedframe. The attachment area may be for instance a flat portion on the outside, or an outer circumference, respectively, of the bedframe, to which the web section of the beam can be attached. Correspondingly, a retaining means facing towards the outer sides of the support assembly is used, since in this case the area at the outside of the support structure, which is hence also at the outside of the nacelle of a wind turbine, must not be accessible during a maintenance procedure. This significantly facilitates the installation and/or maintenance procedures like bolt-retightening since the bolted connection can be accessed easily from the interior of the nacelle. Furthermore, it allows also for a fixation of a canopy to the bolted connection, or for an arrangement of a canopy close to the bolted connection since no gap between the canopy and the bolted connection for accessing the bolts or nuts held by the retaining means is required.

In an embodiment, the retaining means comprises at least one retainer plate which comprises at least one non-circular opening for accommodating a bolt or a nut comprising an outer circumference with at least one non-circular section. In particular, the shape of the non-circular opening may correspond the shape of the non-circular section of the bolt or the nut so that the bolt or the nut may be inserted in the opening in a form-fit connection.

The non-circular opening prevents a turning of the bolt, or of the nut, respectively, in the opening, so that a tightening torque acting on the other side of the bolted connection to a nut, or a bolt, respectively, can be counteracted.

The opening may be for instance oval, hexagonal, rectangular or the like. The opening may comprise one or more straight sections so that a nut or a bolt comprising a correspondingly shaped section may be inserted. In particular, a bolt or a nut comprising a bolt head with one or more flat cuts may be inserted in such an opening. If a bolted connection with a plurality of bolts and nuts is used, the retaining means may hold also both some of the bolts and some of the nuts.

In an embodiment, the retaining means comprises a further retainer plate arranged in parallel and in a distance to the retainer plate, wherein the further retainer plate comprises at least one further opening, wherein the bolt or the nut extends through the non-circular opening of the retainer plate and the further opening of the further retainer plate. By providing a further retainer plate with a further opening, a stable positioning of the bolt or the nut in the openings of the retainer plates becomes possible. A nut, or a bolt, respectively arranged in both the non-circular opening of the retainer plate and the further opening of the further retainer plate is kept in position and might not fall down or change the position when its corresponding counterpart is removed. In embodiments, the usage of the further retainer plate is advantageous when a nut is hold by the retaining means, since the nut can be hold in position and adjacent to a hole in the web section of the beam, so that a bolt can be inserted from the other side through the hole in the web immediately engaging the nut hold by the retaining means.

In an exemplary embodiment, the cross-sectional area of the section of the bolt or the nut accommodated in the further opening is larger in at least one dimension than the non-circular opening in the retainer plate, wherein the further retainer plate is arranged between the web section of the beam and the retainer plate. This has the advantage that the bolts and/or the nuts may be arranged securely between the retainer plate since they are fixated between the two retainer plates. The retainer plate and/or the further retainer plate may also be attached by one or more attachment means, for instance screws, bolts or the like, to the web section of the beam and/or to each other.

In an embodiment, the support structure comprises two beams, which are each attached to one of two opposing attachment areas of the bedframe. Hence by the support structure, the bedframe is extended into one direction forming a base support structure for the nacelle of the wind turbine. It is possible that the two beams of the support structure are supported against each other by further beams arranged perpendicular to the beams attached to the bedframe.

In an exemplary embodiment, the attachment area abuts only the web section of the beam or the attachment area abuts the web section of the beam and at least one flange section of the beam. Depending on the shape of the attachment area it is possible that it abuts only the web section of the beam so that one or more flange sections of the beam are not in direct contact with the bedframe. Alternatively, the bedframe may also abut one or two of the flange sections protruding from the web section of the beam at least towards the bedframe. By having one or more flange sections abutting the attachment section, the internal stability of the beam, for instance of an I-beam, may be increased, since one or more of the flange sections may be supported also on the bedframe, or on the attachment section, respectively.

In an embodiment, at least one supporting element is mounted to at least one side of the web section, wherein the supporting element supports the web section and a flange section of the beam against each other. The supporting element may have for instance an L-shaped cross section, so that the legs of the supporting element may be in direct contact with the web section and the flange section of the beam. This allows for further supporting the web section of the beam towards the or a flange section of the beam and therefore for increasing the inherent stiffness and/or the load taking capability of the beam.

In an embodiment, at least one wedge-shaped compensation element is arranged between the flange section and the supporting element. The wedge-shaped compensation element may be for instance a wedge-shaped shim, or a bevel washer, respectively.

The wedge-shaped compensation element can be used to mitigate tolerances in the beam, in particular with regard to the orientation and/or the shape of the web section and the flange section. Tolerances in the geometry of the profile may cause different issues in a bolted connection, like an unintended loosening of the bolted connection and/or the builtup of stress in the connected part.

By providing the supporting element and/or the wedge-shaped compensation element, these tolerances can be mitigated, in particular without the need for machining and therefore weakening the beam, or the attachment section, respectively. This facilitates the fabrication of the support assembly and prevents a weakening of the profile, at least in the connection area where it has to be strongest for taking the loads when mounted in a wind turbine. Advantageously, optimal load taking capabilities of the support assembly, in particular at the bolted connection, can be obtained.

The wedge-shaped compensation element is in particular slightly thicker in one side than on the opposing side, so that by one or more wedge-shaped compensation elements, a parallelism tolerance in the beam can be mitigated without affecting the quality of the bolted connection. Advantageously, a reducing of preload stresses or additional stresses in the connection area of the beam can be achieved.

The wedge-shaped compensation element may comprise a rectangular shape with a plurality of holes, in particular when the compensation element is also fixated to the beam by a plurality of bolts.

In an embodiment, the beam is an I-beam. Therefore, the beam may comprise a web section arranged between two flange sections, wherein the flange sections are arranged essentially perpendicular to the web section forming an I-shaped cross-sectional area, or an Iprofile of the beam, respectively. By using I-beams, a comparatively high mechanical stiffness at a reduced weight may be obtained so that they may be used advantageously for the support structure of the wind turbine support assembly.

In an exemplary embodiment, a section of the canopy is attachable or attached to the bolted connection and/or at least one canopy attachment means is attached to the bolted connection and/or the retaining means. Since in particular the side of the bolted connection, on which the retaining means is arranged, does not have to be accessed during installation and/or maintenance procedures, a fixation of the canopy to the bolted connection becomes possible. The canopy may be directly fixated to the bolted connection. Additionally or alternatively, also at least one canopy attachment means may be attached to the bolted connection and/or to the retaining means, wherein the canopy is then attachable or attached to the canopy attachment means.

A wind turbine according to embodiments of the invention comprises a wind turbine support assembly according to embodiments of the invention.

All details and advantages described in relation to the wind turbine support assembly apply correspondingly to a wind turbine according to embodiments of the invention and vice versa.

BRIEF DESCRIPTION

Some of the embodiments will be described in detail, with reference to the following figures, wherein like designations denote like members, wherein.

DETAILED DESCRIPTION

Figure 1:
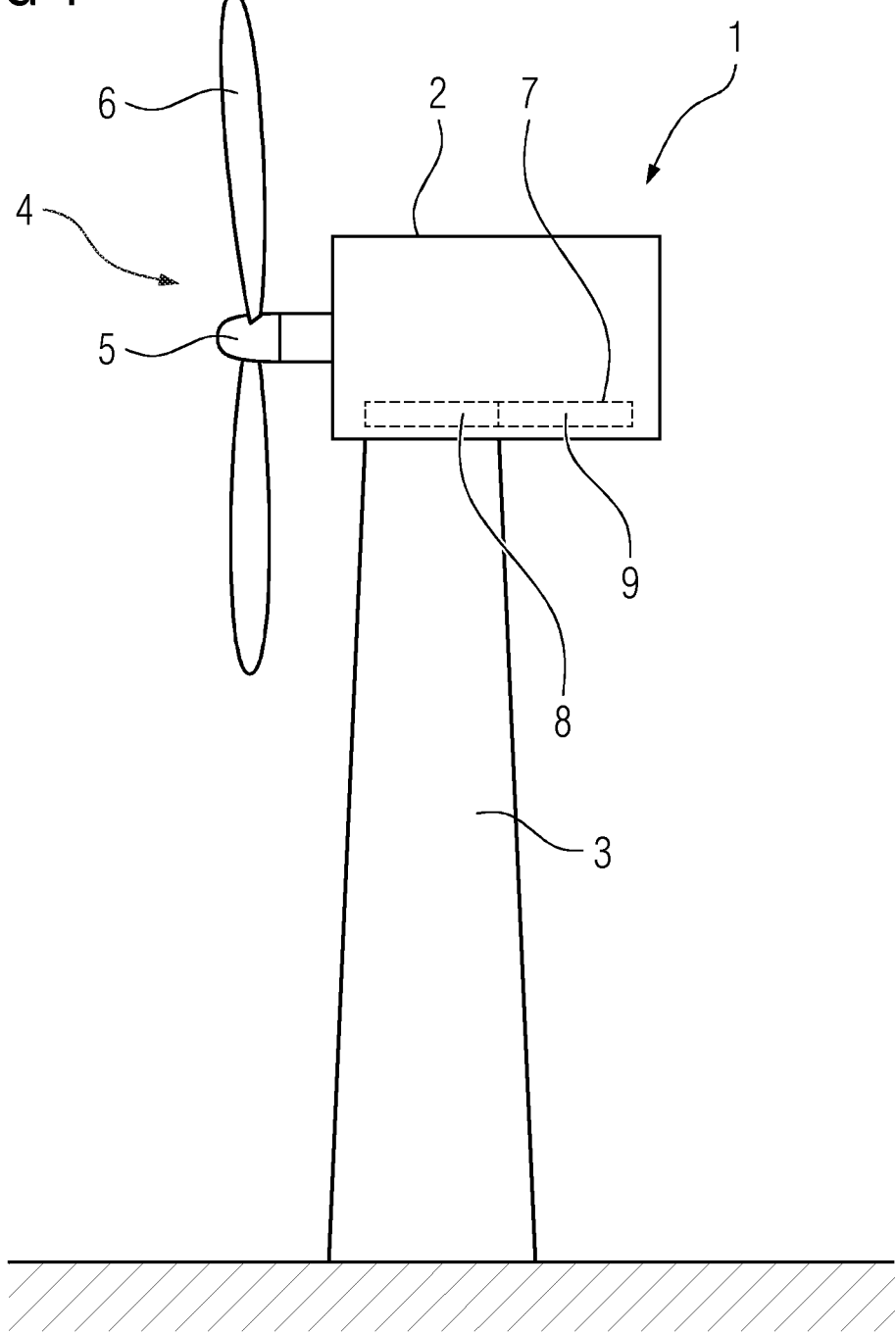
FIG. 1 shows a wind turbine according to embodiments of the invention.

In FIG. 1, an embodiment of a wind turbine 1 is shown. The wind turbine 1 comprises a nacelle 2, which is mounted on top of a tower 3. To a front side of the nacelle 2, a rotor 4 comprising a hub 5 and a plurality of rotor blades 6 is attached. Inside the nacelle 2, further mechanical and/or electrical components of the drive train of the wind turbine 1, for instance a shaft, a gear box, a generator, a converter and/or a transformer, may be arranged.

The wind turbine comprises a wind turbine support assembly 7, which enables the fixation of the nacelle 2 on the tower 3 as well as the supporting of the rotor 4 and the further components in the interior of the nacelle 2. In the following, the wind turbine support assembly 7 is also referred to as support assembly 7 for short.

The support assembly 7 comprises a bedframe 8 and a support structure 9. The bedframe 8 is adapted for attaching the support assembly 7 to the wind turbine tower 3, in particular to a jaw bearing (not shown) arranged at the top of the tower 3 to allow for a rotation of the nacelle 2 with respect to the tower 3. The support structure 9 is attached to the bedframe 8 and protrudes from the bedframe 8 in a lateral direction to form a base support structure for the nacelle 2.

Figure 2:
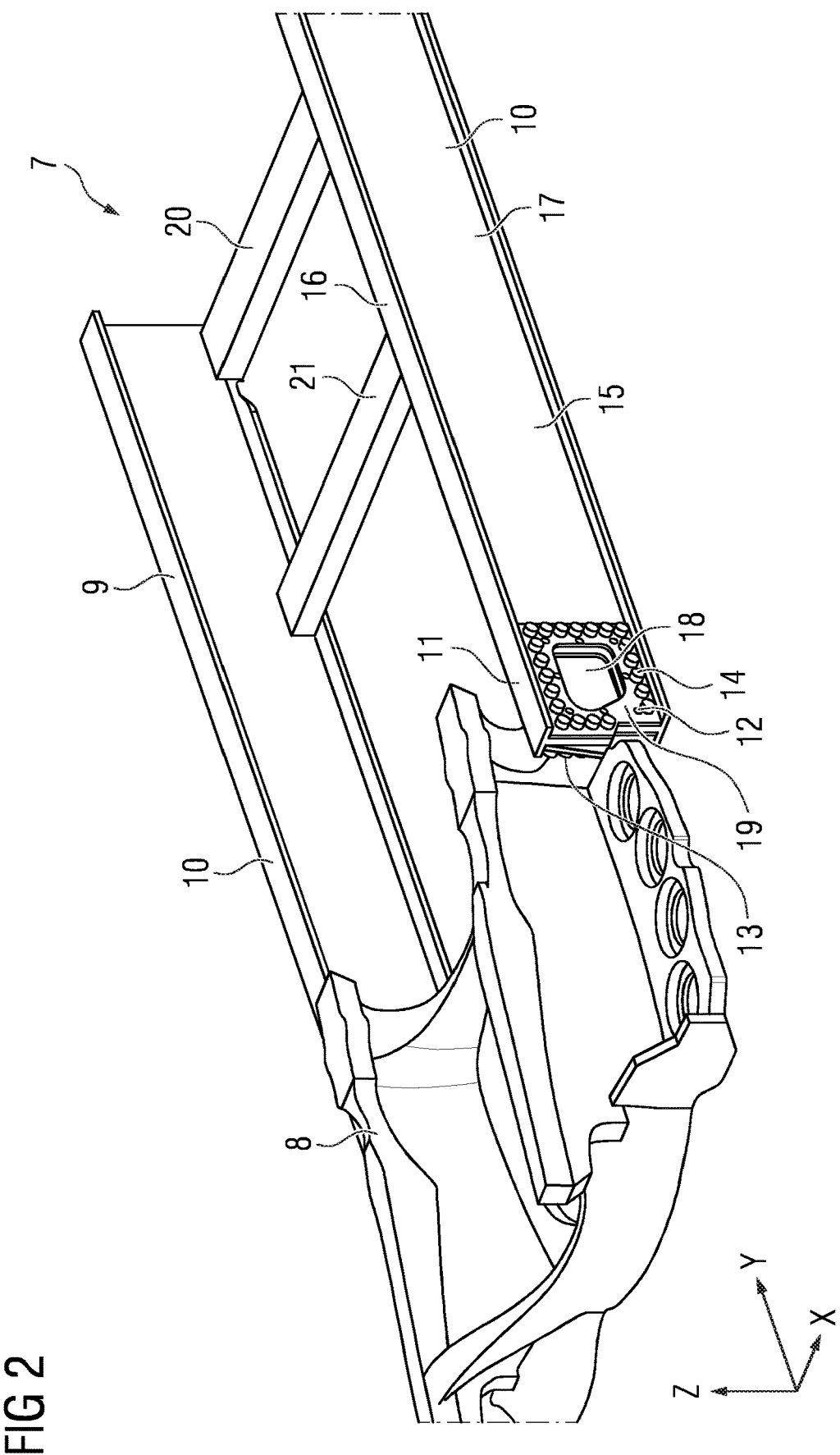
FIG. 2 shows a wind turbine support assembly according to embodiments of the invention.

In FIG. 2, an embodiment of the wind turbine support assembly 7 is shown. The width direction of the support assembly, which corresponds to the width of the nacelle 2, is indicated as x-axis. Correspondingly, the length of the support assembly 7, or the nacelle 2, respectively, is indicated as y-axis spanning from a front end to a rear end and the height of the support assembly 7 is indicated as z-axis.

The support structure 9 comprises two beams 10, which are attached to the bedframe 8. The beams 10 are attached each to an attachment area 11 of the bedframe 8 by a bolted connection 12. The bolted connection 12 comprises a plurality of bolts 13 and nuts 14. The beams 10 are each an I-beam comprising a web section 15 arranged in between an upper flange section 16 and a lower flange section 17. Hence, the beams 10 each comprise a I-shaped cross-sectional area in the xz-plane.

The bolts 13 of the bolted connection 12 are arranged perpendicular to the web section 15. By the bolts 13, the web section 15 and hence the beam 10 are attached to the attachment area 11 of the bedframe 8. The attachment areas 11 are arranged at an outside of the bedframe 8 facing towards the sidewalls of the nacelle 2.

On a side 18 of the web section 15 opposite to the attachment area 11, at least one retaining means 19 is arranged. By the retaining means 19, the nuts 14 attached to the bolts 13 of the bolted connection 12 are hold in a non-rotatable manner. The retaining means 19 is arranged on an outside of the support structure 9 facing away from the bedframe 8. The beams 10 of the support structure 9 may be further supported against each other by one or more further beams 20, 21 at a rear end of the support assembly 7. The beams 10 may be steel beams and on the top flanges 16 of the beams 10 steel plates (not shown) may be fixated, for instance by welding and/or bolting, in order to form for example a floor section of the nacelle 2.

Figure 3:
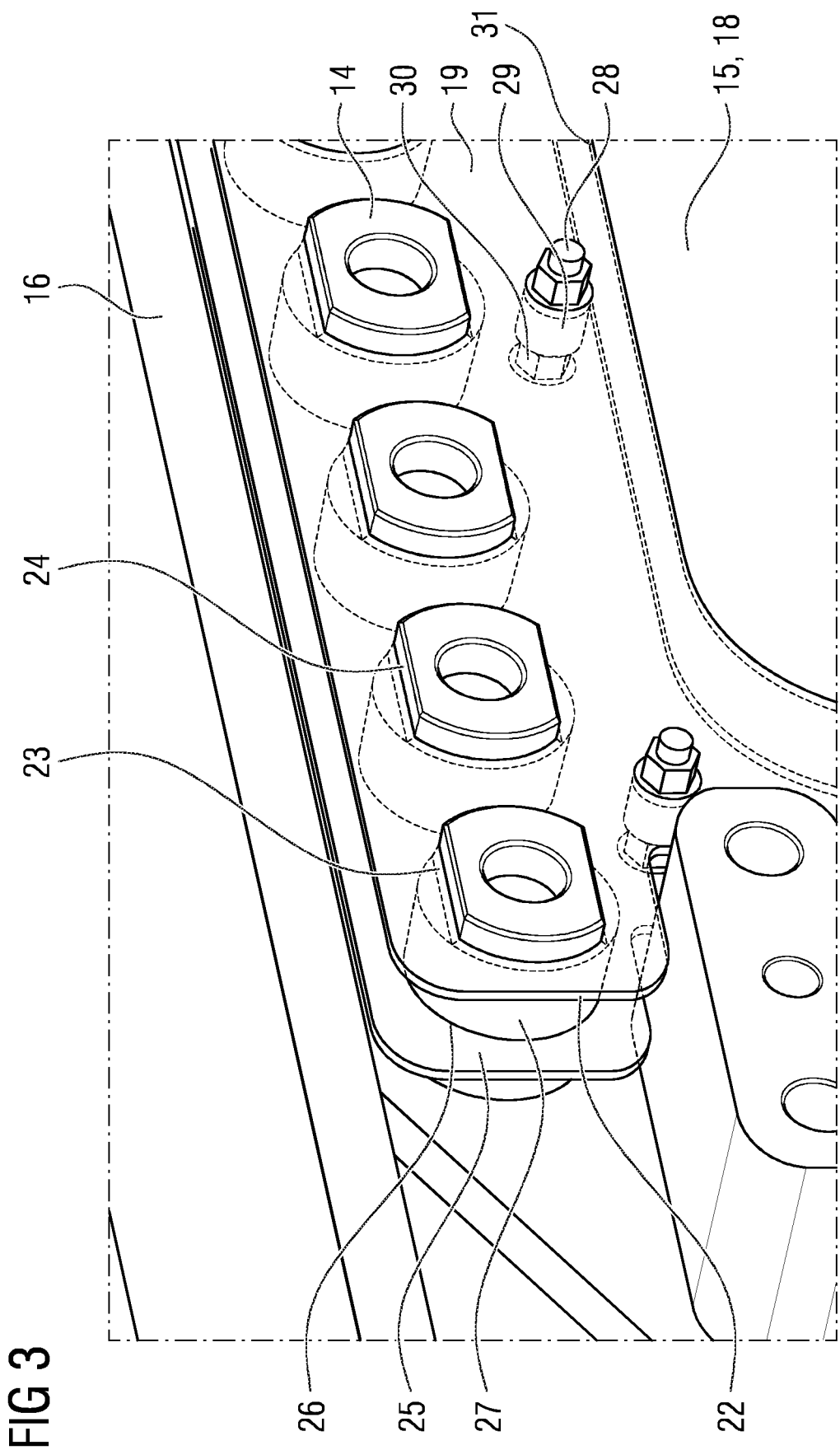
FIG. 3 shows a detailed view of the wind turbine support assembly according to embodiments of the invention.

In FIG. 3, a detailed view of the bolted connection 12 and the retaining means 19 is shown. The retaining means 19 comprises a retainer plate 22 that comprises a plurality of non-circular openings 23 for accommodating the nuts 14. The nuts 14 comprise an outer circumference with at least one non-circular section 24. In this embodiment, the non-circular openings 23 are provided as openings comprising two straight edges and two curved edges.

The non-circular sections 24 of the nuts 14 correspond to the shape of the non-circular openings 23 in the retainer plate 22. This allows for compensating a torque applied to the corresponding bolt 13 for tightening the bolted connection 12. In embodiments, a torque may be applied to the bolt 13 from the inside of the nacelle 2 without the need for arranging a tool for compensating the torque at the outside of the support structure 9.

The retaining means 19 comprises a further retainer plate 25, which is arranged in parallel to the retainer plate 22 with the non-circular openings 23. The further retainer plate 25 is arranged between the retainer plate 22 and the side 18 of the web section 15 of the beam 10. Also the further retainer plate 25 comprises a plurality of openings 26, which are arranged overlappingly with the non-circular openings 23 of the retainer plate 22. The nuts 14 extend each through both a non-circular opening 23 of the retainer plate 22 and a further opening 26 of the further retainer plate 25.

The nuts 14 comprise each a section 27, which abuts the non-circular section 24 engaged in the non-circular holes 23. The outer circumference of the section 27 corresponds to the shape of the further openings 26 in the further retainer plate 25. The cross-sectional area of the section 27 is larger than the non-circular openings 23 in at least one dimension, so that the nuts 14 are stabilized by the retaining means 19. This allows for inserting the corresponding bolts 13 directly into the nuts 14 hold by the retaining means 19 facilitating the installation of the support assembly 7, or the replacement of one of the bolts 13, respectively.

The retainer plate 22 and the further retainer plate 25 are attached to the web section 15 by a plurality of screws 28, wherein in between the retainer plate 22 and the further retainer plate 25 as well as in between the further retainer plate 25 and the web section 15, at least one distance member 29, 30 is arranged. The distance members 29 are each provided as a cylindrical sleeve and the distance member 30 is provided as a nut engaging the screw 28 for fixating the further retainer plate 25 to the beam 10. The retainer plate 22 and/or the further retainer plate 25 may each comprise one or more cut-offs 31 for reducing the weight of the retaining means 19. The cut-offs may have for instance a rectangular or a polygonal shape.

Figure 4:
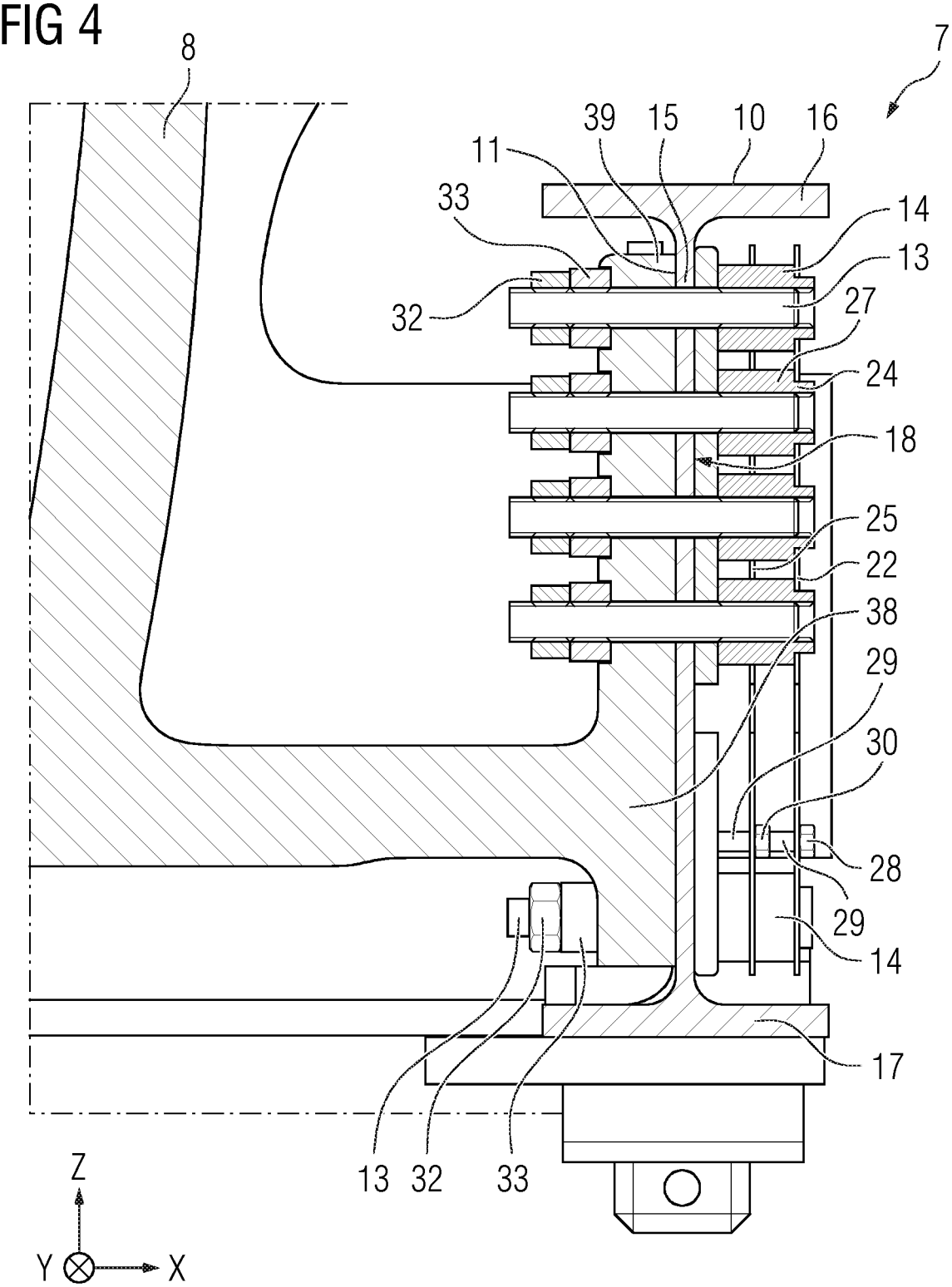
FIG. 4 shows a cut view of the wind turbine support assembly according to embodiments of the invention.

In FIG. 4, a cut view of the support assembly is depicted. The attachment area 11 is located at a protrusion 38 of the bedframe 8, so that fixation means like additional nuts 32, 33 may be attached to the bolts 13, which are provided as threaded stuts. Alternatively, bolts 13 comprising head portions may be inserted in holes 39 of the protrusion 38 to engage into the nuts 19 held by the retaining means 19. However, also other types of bolts 13, threaded struts or the like may be used in the bolted connection 12.

The attachment area 11 abuts only the web section 15 of the beam 10. Between the flange sections 16, 17 of the beam and the attachment area 11, or the protrusion 38 of the bedframe 8, respectively, a gap remains. However, it is also possible that the attachment area 11, or the bedframe 8, respectively, are in direct contact with one or both flange sections 16, 17 supporting the I-shaped cross-section of the beam 10.

Figure 5:
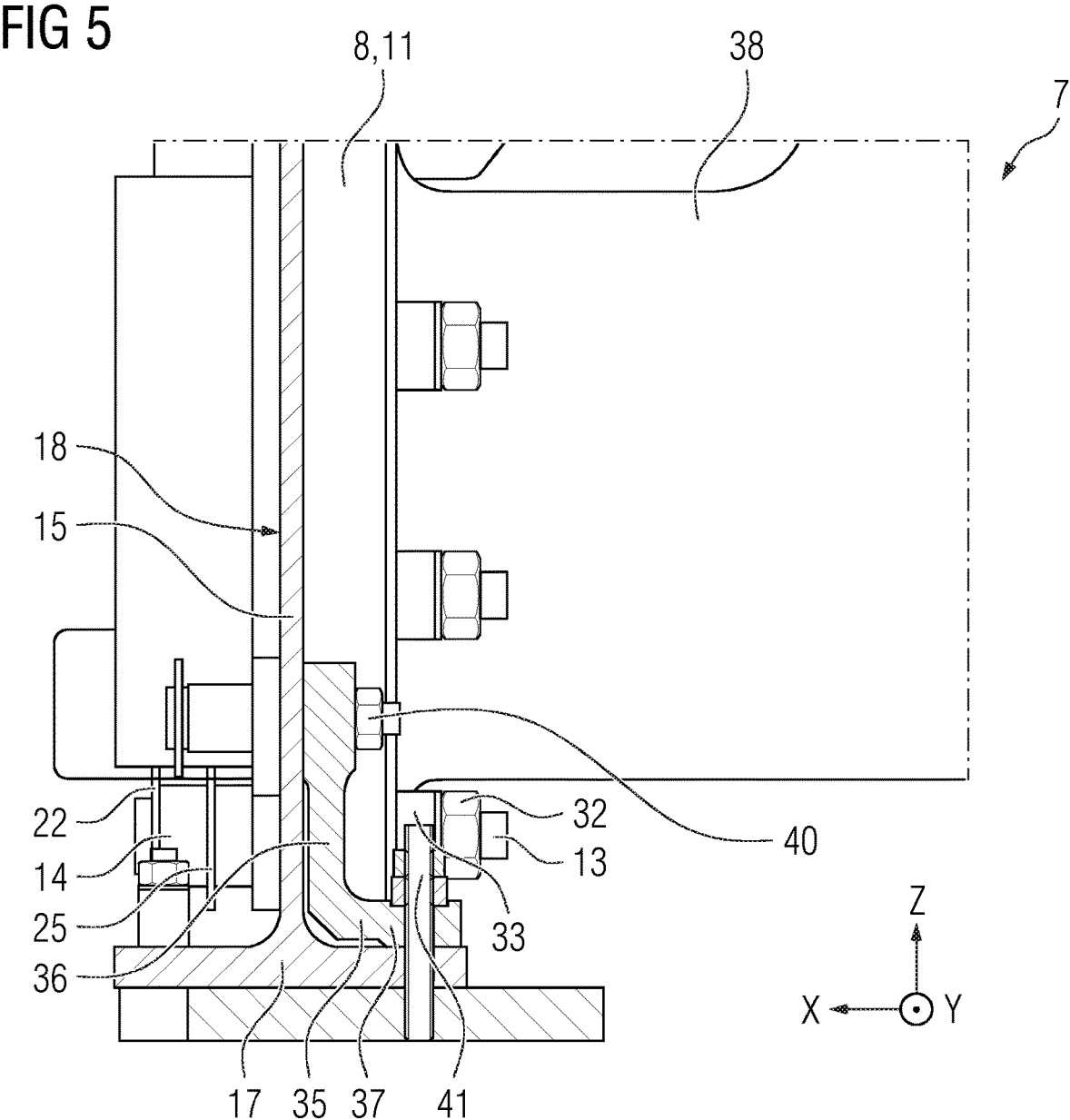
FIG. 5 shows a second cut view of the wind turbine support assembly according to embodiments of the invention.

In FIG. 5, a second cut view of the support assembly 7 is shown. Compared to the first cut view depicted in FIG. 4, the second cut view is displaced in y-direction and may correspond to both the cross section towards the bedframe 8 at the front end of the support assembly 7, or towards the rear end of the support assembly 7, respectively.

To a side 34 of the web section 15 of the beam 10, which is in direct contact with the attachment area 11, a supporting element 35 of the support assembly 7 is mounted. Hence the supporting element 35 is mounted opposite to the side 18, on which the retaining means 19 is arranged.

The supporting element 35 comprises an L-shaped cross section, wherein one leg 36 is attached to the web section 15 and the other leg 37 is attached to the lower flange section 17. The supporting element 35 may be attached for instance using bolted connections 40, 41.

By the supporting element 35, the beam 10, in particular the I-shaped cross-section of the beam 10, may be further reinforced by supporting the web structure 15 against one of the flange structures 17. It is possible that also between the web structure 15 and the upper flange 16 (not shown in FIG. 5), an additional supporting element 35 is mounted in a corresponding manner. In addition or alternatively, it is also possible that on the side 18 of the web structure 15 opposing the attachment area 11 of the bedframe 8, one or more supporting elements 35 are provided.

Figure 6:
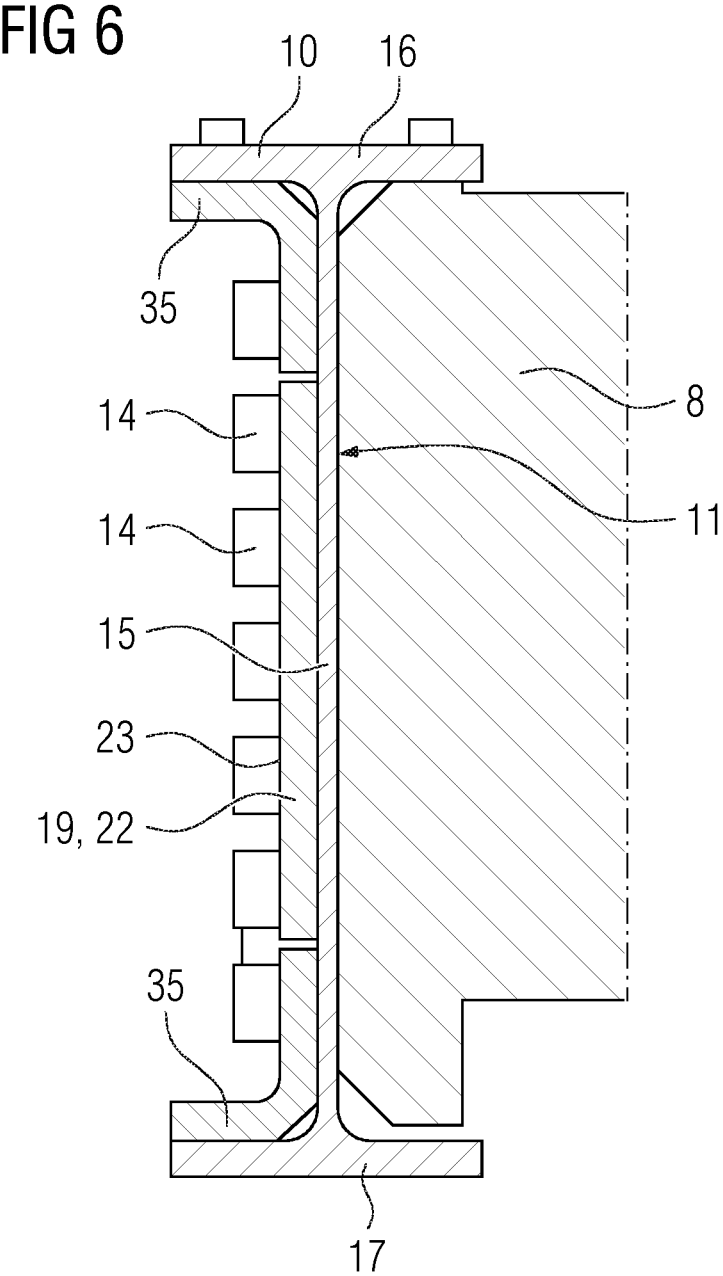
FIG. 6 shows a cut view of a wind turbine support assembly according to further embodiments of the invention.

In FIG. 6, a further embodiment of the supply assembly 7 is shown. In this embodiment, two supporting structures 35 are attached to the side 18 of the web structure 15 which is opposing to the attachment area 11 of the bedframe 8. In this embodiment, the retaining means 19 comprises only one retainer plate 22 with a plurality of non-circular openings 23 as previously described. In this embodiment, the bedframe 8 is in contact with both the web section 15 and the upper flange 16. Additional or alternatively, the bedframe 8 may also be in contact with none of the flanges 13 or with the web section 15, the upper flange section 16 and the lower flange section 17.

By providing the supporting elements 35, tolerances in the geometry of the beam 10, or its I-shaped profile, respectively may be compensated. Furthermore, also a reinforcement of the beam 10 is possible. To further mitigate production tolerances, it is possible that between the supporting elements 35 and the flange sections 16, 17, at least one wedge-shaped compensation element 42 is arranged.

Figure 7:
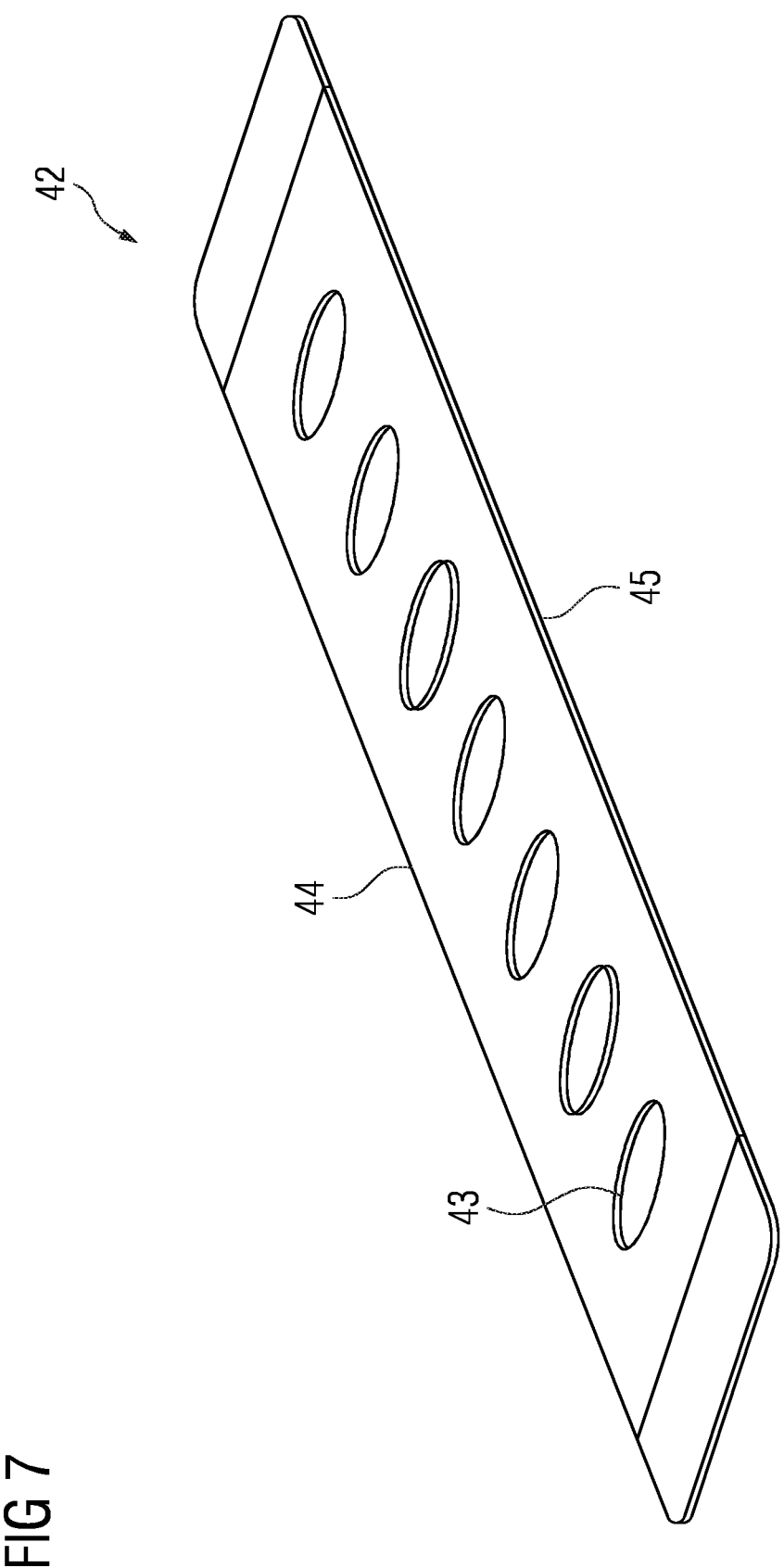
FIG. 7 shows a compensation element for a wind turbine support assembly according to embodiments of the invention.

In FIG. 7, an embodiment of the wedge-shaped compensation element 42 is shown. The wedge-shaped compensation element 42 comprises a plurality of holes 43, through which bolts for the fixation of the supporting elements 35 on the flange sections 16, 17 may be arranged.

The wedge-shaped compensation element 42 is thinner on a first side 44 than on an opposing second side 45 and therefore comprises an increasing thickness from the first side 44 to the second side 45. This allows for compensating geometrical tolerances between the flange sections 16 and/or 17 and the web section 25. This reduces the loads which are induced in the beams 10 by the bolted connection 12. The wedge-shaped compensation element 42 may be used with the supporting elements 35 independently of the side of the wedge-structure 15, to which they are attached.

In the aforementioned embodiments, it is alternatively possible that the heads of the bolts 13 are fixated by the retaining means 19 and that the nuts 14 are screwed on the bolts 13 from the interior side of the nacelle 2. Therefore, the features described in the foregoing in relation to the nuts 14 may also apply to the bolts 13, in particular the shape of the nuts 14 may correspond to the shape of bolt heads of the bolts 13, wherein the bolt heads are arranged correspondingly to the nuts 14 in the retaining means 19. Correspondingly, a non-rotatable fixation of the bolt heads of the bolts 13 becomes possible.

In the aforementioned embodiments, it is possible that a section of a canopy of the nacelle 2 is attachable or attached to the bolted connection 12. In addition or alternatively, at least one canopy attachment means (not shown) may be provided attached to the bolted connection 12 and/or the retaining means 19. Since in particular the outer side of the bolted connection 12, on which the retaining means is arranged 19, does not have to be accessed during installation and/or maintenance procedures, a fixation of the canopy to the bolted connection 12 becomes possible. Therefore, the canopy may be directly fixated to the bolted connection 12 and/or at least one canopy attachment means may be attached to the bolted connection 12 and/or to the retaining means 19, wherein the canopy is then attached or attachable to the canopy attachment means.

In addition or alternatively, it is possible in the aforementioned embodiments that the attachment areas 11 are provided directed to an interior of the nacelle, or towards the center of the support assembly 7, respectively. In this case, also the retaining means 19 may be arranged facing the center of the support assembly 7, so that only the outer sides of the bolted connection 12 located at the outer sides of the support assembly 7, or the nacelle 2, respectively, have to be accessed for establishing or retightening of the bolted connection 12.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A wind turbine support assembly comprising a bedframe and a support structure, wherein the bedframe is configured for attaching the support assembly to a wind turbine tower, wherein the support structure comprises at least one beam, wherein a web section of the beam is attached to an attachment area of the bedframe by a bolted connection comprising a plurality of bolts arranged perpendicular to the web section, wherein on a side of the web section opposite to the attachment area at least one retaining means is arranged for holding a nut, which is attached to a respective bolt of the plurality of bolts, in a non-rotatable manner, wherein the retaining means comprises at least one retainer plate having a plurality of non-circular openings for accommodating a respective nut having an outer circumference with at least one non-circular section, wherein the retaining means comprises a further retainer plate arranged in parallel and at a distance to the retainer plate, wherein the further retainer plate comprises a plurality of further openings, and wherein each nut extends through a respective non-circular opening of the retainer plate and a respective further opening of the further retainer plate.

2. The wind turbine support assembly according to claim 1, wherein the at least one retaining means is arranged on an outside of the support structure facing away from the bedframe.

3. The wind turbine support assembly according to claim 1, wherein the beam is attached to the attachment area at an outside of the bedframe.

4. The wind turbine support assembly according to claim 1, wherein the cross-sectional area of a section of the nut accommodated in the further opening is larger in at least one dimension than the non-circular opening in the retainer plate, wherein the further retainer plate is arranged between the web section of the beam and the retainer plate.

5. The wind turbine support assembly according to claim 1, wherein the support structure comprises two beams, which are each attached to one of two opposing attachment areas of the bedframe.

6. The wind turbine support assembly according to claim 1, wherein the attachment area abuts only the web section of the beam or that the attachment area abuts the web section of the beam and at least one flange section of the beam.

7. The wind turbine support assembly according to claim 1, wherein at least one supporting element is mounted to at least one side of the web section, wherein the at least one supporting element supports the web section and a flange section of the beam against each other.

8. The wind turbine support assembly according to claim 7, wherein at least one wedge-shaped compensation element is arranged between the flange section and the at least one supporting element.

9. The wind turbine support assembly according to claim 1, wherein the beam is an I-beam.

10. The wind turbine support assembly according to claim 1, wherein a section of a canopy is attachable or attached to the bolted connection and/or wherein at least one canopy attachment means is attached to the bolted connection and/or to the retaining means.

11. A wind turbine comprising the wind turbine support assembly according to claim 1.

* * * * *